United States Patent

Nakawaki et al.

Patent Number: 5,122,103
Date of Patent: Jun. 16, 1992

[54] SPEED CHANGING GEAR DEVICE HAVING TWO INDEPENDENT GEAR ASSEMBLIES

[75] Inventors: Yasunori Nakawaki; Toshiyuki Asada; Toshitake Suzuki; Yasuhiko Higashiyama; Akiharu Abe; Naoki Moriguchi, all of Susono, Japan

[73] Assignee: Toyota Jidosha Kabushiki Kaisha, Toyota, Japan

[21] Appl. No.: 460,998

[22] Filed: Jan. 4, 1990

[30] Foreign Application Priority Data

Jan. 23, 1989 [JP] Japan .................. 1-13795

[51] Int. Cl.⁵ ............................ F16H 57/10
[52] U.S. Cl. ........................ 475/278; 475/296; 475/284
[58] Field of Search .......... 475/277, 278, 284, 285, 475/288, 289, 296, 297, 311–313, 323–325

[56] References Cited

U.S. PATENT DOCUMENTS

| 3,971,267 | 7/1976 | Murakami et al. | 475/276 |
| 4,624,154 | 11/1986 | Kraft et al. | 475/278 X |
| 4,939,955 | 7/1990 | Sugano | 475/278 |

FOREIGN PATENT DOCUMENTS

| 51-48062 | 4/1976 | Japan . | |
| 53-123763 | 10/1978 | Japan | 475/284 |
| 53-125560 | 11/1978 | Japan | 475/284 |
| 54-132058 | 10/1979 | Japan . | |
| 60-88252 | 5/1985 | Japan . | |
| 63-43049 | 2/1988 | Japan . | |
| 2-26350 | 1/1990 | Japan . | |
| 2-72245 | 3/1990 | Japan . | |

Primary Examiner—Leslie A. Braun
Assistant Examiner—Benjamin Levi
Attorney, Agent, or Firm—Cushman, Darby & Cushman

[57] ABSTRACT

A speed changing gear device for an automatic transmission, comprising a main gear assembly for providing a plurality of operating positions, and an axiliary gear assembly for providing a direct drive position and a speed changing drive position. The main gear assembly includes a single-pinion type first planetary gear unit having a first sun gear, a first planetary gear, a first ring gear and a first carrier, and a single-pinion type second planetary gear unit having a second sun gear, a second planetary gear, a second ring gear and a second carrier. The auxiliary gear assembly includes a third planetary gear unit having a third sun gear, at least one third planetary gear, a third ring gear and a third carrier. The first carrier and second ring gear are fixed to each other, or selectively connected to each other by a first clutch. The first and second sun gears, and the first sun gear and second carrier are selectively connected to each other by a second and a third clutch, respectively. The first sun gear, second sun gear and second carrier are selectively inhibited from rotating by a first brake, and the second carrier is inhibited from rotating by a second brake.

3 Claims, 8 Drawing Sheets

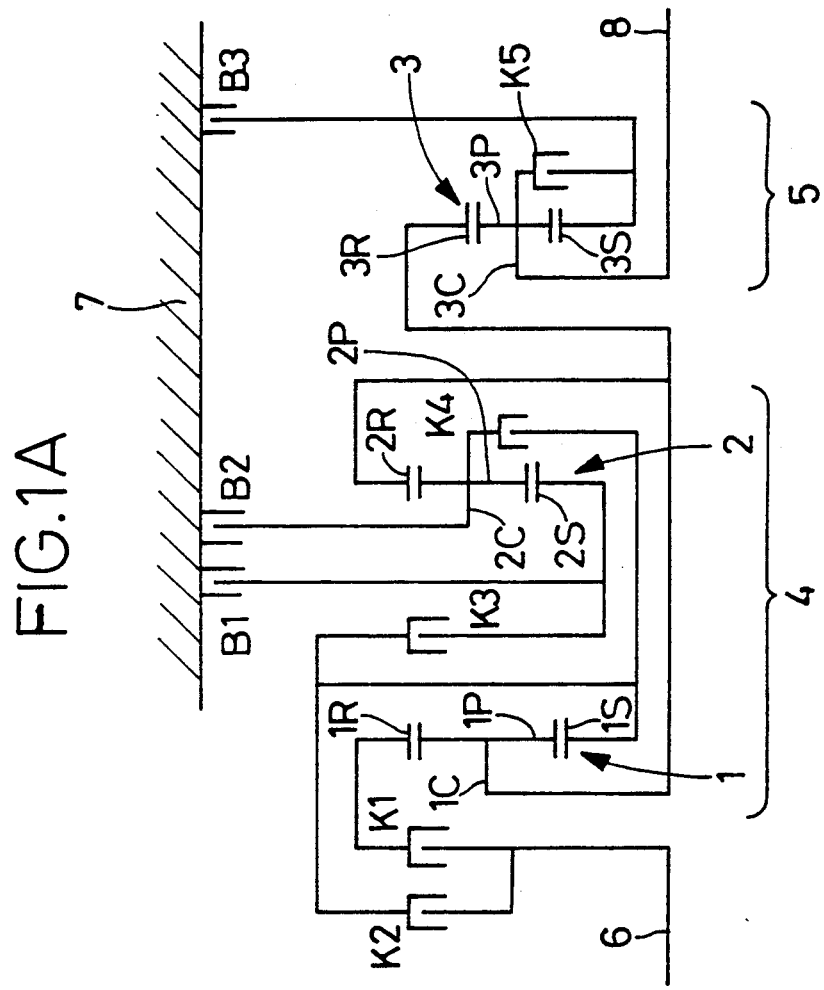

FIG.1B

| | CLUTCHES | | | | | BRAKES | | | SPEED REDUCTION RATIO ($\rho1 = 0.339, \rho2 = 0.428, \rho3 = 0.450$) | |
|---|---|---|---|---|---|---|---|---|---|---|
| | K1 | K2 | K3 | K4 | K5 | B1 | B2 | B3 | | |
| 1st | ○ | | | | | | ○ | ○ | $\dfrac{(\rho1 + \rho2 + \rho1\,\rho2)(1+\rho3)}{\rho2}$ | 3.090 |
| 2nd | ○ | | ○ | | | ○ | | ○ | $(1+\rho1)(1+\rho3)$ | 1.942 |
| 3rd | ○ | | ○ | | ○ | ○ | | | $1+\rho1$ | 1.339 |
| 4th | ○*1 | ○*1 | ○*1 | ○*1 | ○ | | | | 1 | 1.000 |
| 5th | | ○ | ○ | ○ | ○ | ○ | | | $1/(1+\rho2)$ | 0.700 |
| Rev1 | | ○ | ○ | | ○ | | ○ | | $-1/\rho2$ | -2.336 |
| Rev2 | | ○ | ○ | | | | ○ | ○ | $-(1+\rho3)/\rho2$ | -3.388 |

(*1) K1 AND K2, OR K2, K3 AND K4 OR K1, K2, K3 AND K4 ARE ENGAGED

FIG.3B

| | CLUTCHES | | | | | MULTI-DISK BRAKE | | | | ONE-WAY CLUTCH | | | |
|---|---|---|---|---|---|---|---|---|---|---|---|---|---|
| | K1 | K2 | K3 | K4 | K5 | 11 | 12 | 13 | 14 | F1 | F2 | F3 | F4 |
| 1st | O | | O | | | | | O* | O | O | | O | O |
| 2nd | O | | O | | | O | O* | | O | O | O | | O |
| 3rd | O | | O | | O | O | O* | | | O | O | | |
| 4th | O*1 | O*1 | O*1 | O*1 | O | | | | | O | | | |
| 5th | | O | | O | O | | O | | | | | | |
| Rev1 | | O | O | | | | | O | | | | | |
| Rev2 | | O | O | | | | | O | O | | | | O |

(*) THESE MEMBERS ARE ENGAGED WHEN AN ENGINE BRAKE IS APPLIED
(*1) K1 AND K2, OR K2, K3 AND K4 OR K1, K2, K3 AND K4 ARE ENGAGED

FIG.4B

| | CLUTCHES | | | | | BRAKES | | | SPEED REDUCTION RATIO |
|---|---|---|---|---|---|---|---|---|---|
| | K1 | K2 | K3 | K4 | K5 | B1 | B2 | B3 | ($\rho1 = 0.339$, $\rho2 = 0.428$, $\rho3 = 0.311$) |
| 1st | ○ | | ○ | | | | ○ | ○ | $\dfrac{\rho1 + \rho2 + \rho1\,\rho2}{\rho2\,(1-\rho3)}$    3.090 |
| 2nd | ○ | | ○ | | | ○ | | ○ | $(1+\rho1)/(1-\rho3)$    1.943 |
| 3rd | ○ | | ○ | | ○ | ○ | | | $1+\rho1$    1.339 |
| 4th | ○*1 | ○*1 | ○*1 | ○*1 | ○ | | | | 1    1.000 |
| 5th | | ○ | | ○ | ○ | ○ | | | $1+\rho1$    0.700 |
| Rev1 | | ○ | ○ | | | | ○ | | $-1/\rho2$    −2.336 |
| Rev2 | | ○ | ○ | | | | ○ | ○ | $-(1+\rho3)/\rho2$    −3.388 |

(*1) K1 AND K2, OR K2, K3 AND K4 OR K1, K2, K3 AND K4 ARE ENGAGED

SPEED CHANGING GEAR DEVICE HAVING TWO INDEPENDENT GEAR ASSEMBLIES

CROSS-REFERENCE TO RELATED APPLICATIONS

| inventor | Appln. No. |
| --- | --- |
| Asada | 07/437,838, now U.S. Pat. No. 5,007,887 |
| Asada et al | 07/439,607, now U.S. Pat. No. 5,098,357 |
| Asada | 07/439,699, now U.S. Pat. No. 5,049,116 |

BACKGROUND OF THE INVENTION

1. Field of the Invention

The present invention relates in general to a speed changing gear device in an automatic transmission for motor vehicles such as automobiles, and more particularly to such a speed changing gear device which is equipped with a main gear assembly and an auxiliary gear assembly which conduct respective speed changing actions, to provide a plurality of operating positions.

2. Discussion of the Prior Art

A known speed changing gear device used in an automatic transmission for a motor vehicle has a plurality of planetary gear units, each of which includes a sun gear, a ring gear, and a carrier rotatably supporting at least one planetary pinion meshing with the sun and ring gears. One of the three elements of each planetary gear unit, that is, the sun and ring gears and the carrier, serves as an input element which receives a rotary motion to be transmitted by the gear unit, and another element serves as an output element which is connected to another planetary gear unit or output member of the transmission, while the rest of the three elements is held stationary or inhibited from rotating. Thus, the planetary gear unit is capable of transmitting a received rotary motion from the input element to the output element, in one of opposite directions, so that the output speed is reduced or increased with respect to the input speed.

A plurality of the thus constructed planetary gear units may be assembled together to constitute the speed changing gear device, so that the individual planetary gear units perform respective speed changing actions, since each planetary gear unit is capable of conducting an independent speed changing action as described above. In this type of speed changing gear device, one of the planetary gear units (the first planetary gear unit) receives a rotary motion from the input member of the transmission, and the speed of the rotary motion is first changed during transmission thereof through the first planetary gear unit. Thereafter, the speed of the transmitted rotary motion is further changed during transmission thereof through another planetary gear unit next to the first planetary gear unit. Alternatively, a plurality of planetary gear units may be assembled together such that the appropriate elements of the planetary gear units are connected to each other so as to permit these planetary gear units to cooperate with each other to conduct a speed changing action. It is also possible that the speed changing gear device is constituted by a combination of a gear assembly consisting of a plurality of planetary gear units, and another planetary gear unit which is capable of conducting an independent speed changing action. The gear assembly indicated above is constructed such that the appropriate elements of the planetary gear units are connected to each other so as to permit these planetary gear units to cooperate with each other to conduct a speed changing action. Irrespective of the manner in which the planetary gear units are assembled, the speed changing gear device is required to meet various requirements or conditions. For example, the speed changing gear device should be small-sized in view of limited installation space in the transmission system for accommodating the gear device. It is also desirable that the gear device is capable of providing as many operating positions as possible for reduced shifting shocks, and that the number of frictional coupling elements such as clutches and brakes which must be operated when the transmission is shifted up or down is reduced to a minimum so as to facilitate control of the gear device for shiftings of the transmission and to minimize the amount of shifting shock.

Various speed changing gear devices have been developed to satisfy the requirements as described above. For example, laid-open Publication Nos. 51-48062, 54-132058 and 60-88252 of unexamined Japanese Patent Applications disclose speed changing gear devices having three planetary gear units for providing five forward drive operating positions.

The speed changing gear device as disclosed in one of the above-identified publications No. 51-48062 has two single-pinion type planetary gear units and one double-pinion type planetary gear unit. This gear device is constructed such that the appropriate elements of these three planetary gear units are permanently connected or fixed to each other so as to permit the planetary gear units to cooperate with each other to perform a desired speed changing action. While five forward drive positions can be established by this speed changing gear device, the smallest speed reduction ratio available on this gear device is "1", that is, the gear device is not able to provide an overdrive position whose speed reduction ratio is lower than "1". Further, when the transmission is shifted up or down, the speed changing gear device requires disconnection of one element of the gear device from the input member of the transmission, and connection of another element to the input member, and at the same time requires releasing the currently fixed element from a stationary member and fixing another element to the stationary member, whereby a considerable amount of shifting shock is induced. Therefore, the disclosed speed changing gear device requires intricate regulation of the timings at which the frictional coupling elements are engaged or disengaged, for reduced shifting shocks. In this speed changing gear device wherein the appropriate elements of different planetary gear units are fixed to each other, it is practically impossible to convert this gear device having five forward-drive positions into those having four and three forward-drive positions. Thus, this gear device suffers from relatively low versatility and cannot be so widely used for various types of transmission.

On the other hand, the speed changing gear device as disclosed in the above-identified publication No. 54-132058 has a combination of a Ravigneaux type planetary gear assembly and a single-pinion type planetary gear unit. Some operating positions of the gear device are established while the gear assembly and the gear unit are operated independently of each other. Specifically, the speed of the input rotary motion is first changed during transmission thereof through the Ravigneaux type planetary gear assembly, and the speed of the rotary motion transmitted from the gear assembly is further changed during transmission thereof through the single-pinion type planetary gear unit. In the other operating positions, the appropriate elements of the gear assembly and gear unit are connected to each other, so that the gear assembly cooperates with the gear unit to perform a desired speed changing action. In this arrangement, it is practically impossible to eliminate the single-pinion type planetary gear unit and thereby convert the present gear device having five forward-drive positions into those having fewer forward-drive positions. Thus, the speed changing gear device disclosed in this publication also suffers from relatively low versatility. Further, the present device requires a total of three frictional coupling elements to be operated for engagement or disengagement, when the transmission is shifted up from the 3rd-speed position to the 4th-speed position. Consequently, the shifting to the frequently used position (4th-speed position) requires intricate control of the three coupling elements of the gear device, so as to avoid increased shifting shocks.

The speed changing gear device as disclosed in the above-identified publication No. 60-88252 is constituted by a first, a second and a third single-pinion type planetary gear unit, for providing five forward-drive positions including an overdrive position and one reverse position. In this gear device, the 2nd-speed position is established such that the three planetary gear units conduct respective speed changing actions one after another during power transmission through the gear device. When the gear device is placed in the other positions, however, the mutually connected three planetary gear units cooperate with each other to conduct the relevant speed changing action. In this case, too, it is practically impossible to convert the present gear device into those having fewer operating positions. Further, the speed changing gear device disclosed in this publication suffers from a relatively large gear ratio $\rho$ of the planetary gear units, which unfavorably increases the radial size of the gear device.

The conventional speed changing gear devices as described above are constructed such that the appropriate elements of the planetary gear units are connected to each other, so that the gear units as a whole contribute to a speed changing action for a desired operating position. Therefore, these planetary gear units cannot be radially spaced from each other and must be disposed in series coaxially with each other. Such a speed changing gear device can be suitably installed on the front-engine rear-drive type of vehicle, but not on the front-engine front-drive type of vehicle wherein the power transmission system must be accommodated in a casing having a relatively limited axial length.

SUMMARY OF THE INVENTION

The present invention was developed in the light of the situations described above. It is accordingly an object of the invention to provide a speed changing gear device in an automatic transmission for a motor vehicle, which is simple in construction, assuring reduced shifting shocks and easy control of the gear device for shifting operations.

The above object may be attained according to the principle of the present invention, which provides a speed changing gear device for an automatic transmission having an input member and an output member, comprising a main gear assembly disposed between the input member and the output member for providing a plurality of operating positions including at least four forward-drive positions and one reverse position, and including a single-pinion type first planetary gear unit having a first sun gear, a first planetary pinion meshing with the first sun gear, a first ring gear meshing with the first planetary pinion, and a first carrier rotatably supporting the first planetary pinion, and a single-pinion type second planetary gear unit having a second sun gear, a second planetary pinion meshing with the second sun gear, a second ring gear meshing with the second planetary pinion, and a second carrier rotatably supporting the second planetary pinion, and an auxiliary gear assembly disposed between the input member and the output member for providing a direct drive position whose speed reduction ratio is 1, and a speed changing drive position whose speed reduction ratio is other than 1, and including a third planetary gear unit having a third sun gear, at least one third planetary pinion meshing with the third sun gear, a third ring gear meshing with the above-indicated at least one third planetary pinion, and a third carrier rotatably supporting the at least one third planetary pinion. The main gear assembly further includes (a) one of fixing means for fixing the first carrier and the second ring gear to each other, and first clutch means for selectively connecting the first carrier and second ring gear to each other, (b) second clutch means for selectively connecting the first sun gear and the second sun gear to each other, (c) third clutch means for selectively connecting the first sun gear and the second carrier to each other, (d) first brake means for selectively inhibiting the second sun gear and from rotating, and (e) second brake means for selectively inhibiting the second carrier from rotating.

Where the first carrier and the second ring gear are fixed to each other, these two elements may be separate members secured to each other by a suitable method. Alternatively, the two elements may be formed as a single integral member which attains two functions corresponding to the two elements. In the latter case, too, the two elements are interpreted to be fixed to each other by fixing means, according to the principle of the present invention. The clutch means indicated above may be a clutch which is engaged for connecting the appropriate two elements indicated above.

In the speed changing gear device of the present invention constructed as described above, the main gear assembly can provide at least four forward-drive positions by itself, and the auxiliary gear assembly contributes to a speed changing action of the gear device only when the currently established operating position of the main gear assembly has a speed reduction ratio which is higher or lower than that of a predetermined one of these at least four positions. Therefore, the speed changing gear device as a whole is able to provide a total of at least five forward-drive positions. Namely, the main gear assembly is adapted to establish the operating position having the highest speed reduction ratio, when the gear assembly receives a rotary motion from the input member of the transmission while the sun gears of the first and second planetary gear units are connected to each other, and while the carrier of the second planetary gear unit is inhibited from rotating. If the sun gears of the first and second planetary gear units rather than the second carrier are inhibited from rotating, the speed reduction ratio provided by the main gear assembly becomes slightly lower than the highest speed reduction ratio. Further, when two of the three elements (sun and ring gears and carrier) of each of the first and second planetary gear units are rotated at the same speed, the speed reduction ratio is "1", that is, the main gear assembly is placed in the direct drive position. When the carrier of the second planetary gear unit receives a rotary motion from the input member of the transmission while the sun gear of the second planetary gear unit is inhibited from rotating, the speed reduction ratio provided by the main gear assembly is lower than "1". In the case where the auxiliary gear assembly is adapted to conduct a speed reducing action while the main gear assembly is placed in the 1st-speed and 2nd-speed positions, for example, the speed changing gear device will be able to provide a total of five forward drive positions. Namely, the 1st- and 2nd-speed positions of the gear device are established when both the main and auxiliary gear assemblies contribute to the speed changing actions for these operating positions. The 3rd-speed position of the gear device is established when the main gear assembly is placed in its 2nd-speed position while the auxiliary gear assembly does not contribute to the speed changing action (i.e., the auxiliary gear assembly is in the direct drive position). Similarly, the 4th- and 5th-speed positions of the gear device are established when the main gear assembly is placed in its 3rd- and 4th-speed positions, respectively, while the auxiliary gear assembly does not contribute to the speed changing actions. In the case where the auxiliary gear assembly is adapted to increase the speed of the input rotation, such a speed increasing action of the auxiliary gear assembly is conducted while the main gear assembly is placed in the 3rd- and 4th-speed positions. In this case, too, a total of five forward drive positions can be established by the speed changing gear device.

The instant speed changing gear device can be easily modified by eliminating the auxiliary gear assembly and connecting the input and output members of the transmission directly to the main gear assembly, so that the modified gear device having only the main gear assembly has a reduced number of operating positions, for example, four forward-drive positions and one reverse position. Thus, the speed changing gear device according to the present invention can be widely used in various types of transmission. It is also to be noted that the main gear assembly and the auxiliary gear assembly operate independently of each other during power transmission of the gear device. That is, the main gear assembly does not cooperate with the auxiliary gear assembly to perform its speed changing action. Therefore, these two gear assemblies are not necessarily disposed on the same axis, but may be disposed on different parallel axes so as to reduce the axial length of the speed changing gear device as a whole, for improved installation adaptability to the vehicle body, particularly, to the front-engine front-drive vehicle.

The auxiliary gear assembly may be interposed between the output member of the transmission, and the first carrier and second ring gear of the main gear assembly. In this case, the first sun and ring gears are selectively connectable to the input member of the transmission through respective clutch means. Alternatively, the auxiliary gear assembly may be interposed between the input member of the transmission, and the first ring gear and second and third clutch means of the main gear assembly, with the third ring gear being fixed to the input member. In this case, the first sun and ring gears are selectively connectable to the third carrier.

The auxiliary gear assembly is placed in the direct drive position while one of the operating positions of the main gear assembly which is currently established has a speed reduction ratio which is higher or lower than that of a predetermined one of the operating positions.

The third planetary gear unit may be a single-pinion type planetary gear set having one planetary gear pinion, or may be a double-pinion type planetary gear set having at least one pair of planetary gear pinions.

The main gear assembly and the auxiliary gear assembly may be disposed in series coaxially with each other, or may be disposed on different axes which are parallel with each other.

BRIEF DESCRIPTION OF THE DRAWINGS

The above and optional objects, features and advantages of the present invention will become more apparent by reading the following detailed description of presently preferred embodiments of the invention, taken in connection with the accompanying drawings, in which:

FIGS. 1A, 2, 3A, 4A and 5 are schematic views showing different embodiments of the speed changing gear device of the present invention; and FIGS. 1B, 3B and 4B are views indicating the operating states of individual clutches and brakes in relation to the operating positions of the speed changing gear devices of FIG. 1A, 3A and 4A, respectively, FIGS. 1B and 4B also indicating the speed reduction ratios of the gear devices.

DETAILED DESCRIPTION OF THE PREFERRED EMBODIMENTS

Figure 2:
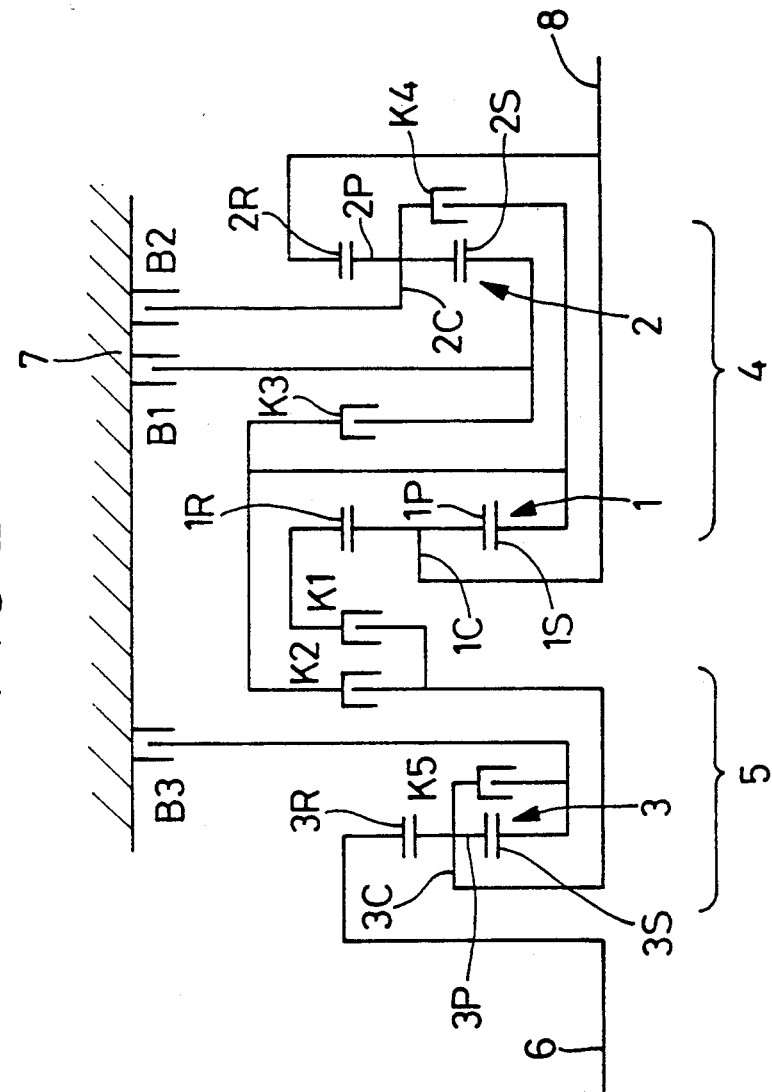

Referring first to FIG. 1A, there is shown one embodiment of the speed changing gear device of the present invention, which has a main gear assembly 4 including a first and a second planetary gear unit 1, 2, and an auxiliary gear assembly 5 including a third planetary gear unit 3. The main gear assembly 4 and auxiliary gear assembly 5 are disposed in series coaxially with each other, such that the main gear assembly 4 is located adjacent to the input member of the transmission in the form of an input shaft 6, while the auxiliary gear assembly 5 is located adjacent to the output member of the transmission in the form of an output shaft 8.

The first planetary gear unit 1 of the main gear assembly 4 is a single-pinion type planetary gear set whose major elements consist of a first sun gear 1S, a first planetary pinion 1P meshing with the first sun gear 1S, a first ring gear 1R coaxial with the first sun gear 1S and meshing with the first planetary pinion 1P, and a first carrier 1C rotatably supporting the first planetary pinion 1P. The second planetary gear unit 2 of the main gear assembly 4 is also a single-pinion type planetary gear set whose major elements consist of a second sun gear 2S, a second planetary pinion 2P meshing with the second sun gear 2S, a second ring gear 2R coaxial with the second sun gear 2S and meshing with the second planetary pinion 2P, and a second carrier 2C rotatably supporting the second planetary pinion 2P.

The elements of these two planetary gear units 1, 2 of the main gear assembly 4 are connected to each other in the following manner. Namely, a first clutch K1 is provided to selectively connect the input shaft 6 and the ring gear 1R of the first planetary gear unit 1, while a second clutch K2 is provided to selectively connect the input shaft 6 and the sun gear 1S of the first planetary gear unit 1. The carrier 1C of the first planetary gear unit 1 and the ring gear 2R of the second planetary gear unit 2 are integrally fixed to each other for rotation as a unit. Between the sun gears 1S, 2S of the first and second planetary gear units 1, 2, a third clutch K3 is provided to selectively connect the two members 1S, 2S. Further, a fourth clutch K4 is provided between the sun gear 1S of the first planetary gear unit 1 and the carrier 2C of the second planetary gear unit 2 for selective connection therebetween.

For selectively locking or holding stationary the sun gear 2S of the second planetary gear unit 2, there is provided a first brake B1 between the second sun gear 2S and a stationary transmission casing hereinafter, referred to simply as "casing") 7. Between this casing 7 and the carrier 2C of the second planetary gear unit 2, there is disposed a second brake B2 so that the second carrier 2C is selectively held stationary or fixed to the casing 7 by the second brake B2. In the main gear assembly 4, the first carrier 1C and the second ring gear 2R are integrally fixed together to serve as an output element of the gear assembly 4, which is connected to an input element of the auxiliary gear assembly 5 which will be described below.

The third planetary gear unit 3 of the auxiliary gear assembly 5 is a single-pinion type planetary gear set whose major elements consist of a third sun gear 3S, a third planetary pinion 3P meshing with the third sun gear 3S, a third ring gear 3R coaxial with the third sun gear 3S and meshing with the third planetary pinion 3P, and a third carrier 3C rotatably supporting the third planetary pinion 3P. To the third ring gear 3R is fixedly connected the output element of the main gear assembly 4, i.e., the integrally fixed first carrier 1C and second ring gear 2R. Thus, the third ring gear 3R serves as the input element of the auxiliary gear assembly 5. This third planetary gear unit 3 has two power transmission modes, i.e., speed reduction mode wherein a rotary motion received from the output member of the main gear assembly 4 is transmitted to an output member of the auxiliary gear assembly 5, at a speed reduction ratio which is higher than 1, and direct drive mode whose speed reduction ratio is 1. In order to establish these two power transmission modes, the third planetary gear unit 3 has a fifth clutch K5 disposed between the third sun gear 3S and carrier, 3C for selectively connecting these members 3S, 3C, and a third brake B3 disposed between the third sun gear 3S and the casing 7 for selectively fixing the third sun gear 3S to the casing 7.

The output shaft 8 of the transmission is fixed to the carrier 3C of the third planetary gear unit 3 of the auxiliary gear assembly 5.

Means for integrally fixing the elements together as indicated above may be a suitable hollow or solid shaft or a suitable connecting drum usually employed in an ordinary automatic transmission for fixing functionally different elements for rotation as a unit.

The input shaft 6 is connected to an engine (not shown) of a motor vehicle through suitable power transmission means (not shown) such as a torque converter or fluid coupling. On the other hand, the output shaft 8 is connected to a differential gear device (final reduction gear) of the power transmitting system, directly or through a propeller shaft or counter gear.

The above-described clutches K1-K6 function to selectively connect the appropriate two elements of the speed changing gear device, i.e., are engaged for connection of the appropriate two elements when needed, and are disengaged for disconnection of the two elements from each other. For example, the clutches K1-K6 may be a wet-type multiple-disk clutch, a one-way clutch, or a combination of a wet-type multiple-disk clutch and a one-way clutch, which are operated by suitable actuators such as a hydraulic servo unit generally employed for known automatic transmissions. In the third case, the multiple-disk clutch and the one-way clutch may be disposed in series or parallel with each other. In practice, a suitable intermediate member such as a connecting drum is used for operatively associating the appropriate two elements of the gear device with the clutches K1-K6, since there are actually more or less restrictions in locating the clutches in the speed changing gear device.

The first, second and third brakes B1, B2, B3 may be a wet-type multiple-disk brake, a band brake, or a one-way clutch, or a combination of these frictional coupling components, and may be operated by suitable actuators such as a hydraulic servo unit generally employed for known automatic transmissions. Certainly, there are provided suitable connecting members as described above with respect to the clutches K1-K6, between each brake B1, B2, B3 and the elements that are braked by the brakes B1-B3, or between the brake and the casing 7.

The present speed changing gear device of FIG. 1A constructed as described above provides a total of five forward drive positions (1st-speed, 2nd-speed, 3rd-speed, 4th-speed and 5th-speed positions), and two reverse positions (1st-speed and 2nd-speed positions). These operating positions of the gear device are established by concurrent engagement of the members selected from among the five clutches K1-K5 and three brakes B1, B2, B3, as indicated in the table of FIG. 1B. In the table, the engaged clutch or clutches and brake or brakes are indicated by "o" marks, while the disengaged clutch or clutches and brake or brakes are indicated by blank spaces. The table also indicates the speed reduction ratio of each operating position of the speed changing gear device, where gear ratios $\rho_1$, $\rho_2$, $\rho_3$ of the first, second and third planetary gear units 1, 2, 3 are 0.339, 0.428 and 0.450, respectively. There will be described each of the seven operating positions of the instant speed changing gear device.

1ST-SPEED FORWARD-DRIVE POSITION

In the main gear assembly 4, the first clutch K1 is engaged to connect the input shaft 6 and the first ring gear 1R, and the third clutch K3 is engaged to connect the first sun gear 1S and the second sun gear 2S, while the second brake B2 is engaged to fix the second carrier 2C to the casing 7. Consequently, the first ring gear 1R is rotated with the input shaft 6 while a load is applied to the first carrier 1C, whereby the first sun gear 1S is rotated in the reverse direction opposite to the direction of rotation of the input shaft 6, and therefore the second sun gear 2S integral with the first sun gear 1S is rotated in the same reverse direction. The term "reverse direction" will be hereinafter used to indicate the direction opposite to the rotating direction of the input shaft 6. In the second planetary gear unit 2, the second sun gear 2S is rotated in the reverse direction with the second carrier 2C held stationary, whereby the second ring gear 2R is rotated at a relatively low speed, in the forward direction, i.e., in the same direction as the input shaft 6. The term "forward direction" will be hereinafter used to indicate the direction in which the input shaft 6 is rotated. Thus, the main gear assembly 4 as a whole performs a speed reducing action so that the rotation of the input shaft 6 is transmitted through the first carrier 1C and the second ring gear 2R to the ring gear 3R of the third planetary gear unit 3, whereby the third ring gear 3R is rotated in the forward direction at the speed reduction ratio of $(\rho_1+\rho_2+\rho_1\rho_2)/\rho_2$.

In the auxiliary gear assembly 5, the third brake B3 is engaged to fix the sun gear 3S of the third planetary gear unit 3 to the casing 7. In this case, the third carrier 3C is rotated at a speed lower than that of the third ring gear 3R, in the same direction as the third ring gear 3R. As a result, the rotary motion of the third ring gear 3R received from the main gear assembly 4 is transmitted to the output shaft 8 so that the output shaft 8 is rotated at a reduced speed as compared with the speed of the third ring gear 3R. Thus, the third planetary gear unit 3 is in the speed reduction mode as described above, in which the speed reduction ratio is represented by $(1+\rho_3)$.

It follows from the above description that the speed changing gear device as a whole functions to transmit the rotation of the input shaft 6 to the output shaft 8 so that the output shaft 8 is rotated at a considerably reduced speed as compared with the speed of rotation of the input shaft 6. The speed reduction ratio of this 1st-speed position is represented by $(\rho_1+\rho_2+\rho_1\rho_2)(1\rho_3)/\rho_2$, which is equal to 3.090 as indicated in the table of FIG. 1B. In this case, no circulation of power will occur in the main gear assembly 4 as well as in the auxiliary gear assembly 5.

2ND-SPEED FORWARD-DRIVE POSITION

In the main gear assembly 4, the first and third clutches K1, K3, and the first brake B1 are engaged, while in the auxiliary gear assembly 5, the third brake B3 is engaged. More specifically, the 2nd-speed position is established by releasing the the second brake B2 and engaging the first brake B1 while the speed changing gear device is placed in the 1st-speed position. Consequently, in the main gear assembly 4, the first ring gear 1R is rotated with the input shaft 6 while the first and second sun gears 1S, 2S are fixed to the casing 7 by means of the first brake B1. In the first planetary gear unit 1, the first ring gear 1R is rotated with the input shaft 6 with the first sun gear 1S held stationary, whereby the first carrier 1C is rotated in the forward direction at a speed lower than that of the first ring gear 1R (input shaft 6), and the rotation of the first carrier 1C is transmitted to the ring gear 3R of the third planetary gear unit 3. In this 2nd-speed position, the second planetary gear unit 2 does not contribute to a speed changing action, since the secoind carrier 2C is not fixed to the casing 7 and not connected to the first sun gear 1S. The speed reduction ratio provided by this main gear assembly 4 represented by $(1+\rho_1)$.

The auxiliary gear assembly 5 operates in the same manner as in the 1st-speed position. Namely, the rotary motion of the third ring gear 3R received from the main gear assembly 4 is transmitted to the output shaft 8 so that the output shaft 8 is rotated at a reduced speed as compared with the speed of the third ring gear 3R. Thus, the third planetary gear unit 3 is in the speed reduction mode in which the speed reduction ratio is represented by $(1+\rho_3)$.

It follows from the above description that the speed changing gear device as a whole functions to transmit the rotation of the input shaft 6 to the output shaft 8 so that the output shaft 8 is rotated at a relatively reduced speed as compared with that of the input shaft 6. The speed reduction ratio of this 2nd-speed position is represented by $(1+\rho_1)(1+\rho_3)$, which is equal to 1.942 as indicated in the table of FIG. 1B. In this case, too, no circulation of power will occur.

3RD-SPEED FORWARD-DRIVE POSITION

In the main gear assembly 4, the first and third clutches K1, K3 and the first brake B1 are engaged, while in the auxiliary gear assembly 5, the fifth clutch K5 is engaged. More specifically, the 3rd-speed position is established by releasing the third brake B3 of the auxiliary gear assembly 5 and engaging the fifth clutch K5. Namely, the main gear assembly 4 operates in the same manner as in the 2nd-speed position, i.e., performs the speed reducing action to provide the speed reduction ratio of $(1+\rho_1)$. In the auxiliary gear assembly 5, on the other hand, the fifth clutch K5 is engaged to connect the carrier 3C and sun gear 3S of the third planetary gear unit 3, whereby the whole structure of the third planetary gear unit 3 is rotated as a unit. That is, the auxiliary gear assembly 5 is in the direct drive mode as described above, in which the speed reduction ratio is "1". Thus, the rotation of the third ring gear 3R is transmitted to the third carrier 3C so that the two members 3R, 3C are rotated at the same speed.

It follows from the above description that only the first planetary gear unit 1 of the main gear assembly 4 contributes to the speed reducing action in this 3rd-speed position. Therefore, the speed reduction ratio of the speed changing gear device is represented by $(1+\rho_1)$, which is equal to 1.339 as indicated in the table of FIG. 1B. In this case, too, no circulation of power will occur.

4TH-SPEED FORWARD-DRIVE POSITION

In the main gear assembly 4, the first and second clutches K1, K2, or the second through fourth clutches K2, K3, K4, or the first through fourth clutches K1, K2, K3, K4 are engaged, while in the auxiliary gear assembly 5, the fifth clutch K5 is engaged. More specifically, the 4th-speed position is established by releasing the first brake B1 and engaging the second clutch K2 or the second and fourth clutches K2, K4 while the speed changing gear device is placed in the 3rd-speed position. When at least the first and second clutches K1, K2 of the main gear assembly 4 are engaged, both the first ring gear and sun gear 1R, 1S are rotated with the input shaft 6, with the first planetary gear unit 1 as a whole rotating as a unit. As a result, the rotation of the input shaft 6 is directly transmitted to the auxiliary gear assembly 5 through the first planetary gear unit 1. When the second through fourth clutches K2, K3, K4 are engaged, the second sun gear and carrier 2S, 2C are rotated with the input shaft 6, with the second planetary gear unit 2 as a whole rotating as a unit. As a result, the rotation of the input shaft 6 is directly transmitted to the auxiliary gear assembly 5 through the second planetary gear unit 2. In other words, the main gear assembly 4 placed in the 4th-speed position performs no speed changing action. It is noted that the auxiliary gear assembly 5 also performs no speed changing action, since the third planetary gear unit 3 is rotated as a unit with the third carrier and sun gear 3C, 3S being connected by the fifth clutch K5.

It follows from the above description that the power transmission in this 4th-speed position occurs with the gear train of the speed changing gear device as a whole rotating as a unit. Thus, the 4th-speed position provides the speed reduction ratio of "1", and may be referred to as "direct drive" position, when appropriate. It will be readily understood that no circulation of power will occur.

5TH-SPEED FORWARD-DRIVE POSITION

In the main gear assembly 4, the second and fourth clutches K2, K4 and the first brake B1 are engaged, while in the auxiliary gear assembly 5, the fifth clutch K5 is engaged as in the 3rd- and 4th-speed positions. More specifically, the 5th-speed position is established by releasing the first clutch K1 and engaging the first brake B1 while the gear device is placed in the 4th-speed position with the first, second, and fourth clutches K1, K2, K4 being engaged, for example. Consequently, in the second planetary gear unit 2 of the main gear assembly 4, the second carrier 2C is rotated with the input shaft 6 with the second sun gear 2S held stationary, whereby the second ring gear 2R is rotated in the forward direction at a speed higher than that of the second carrier 2C. This rotary motion of the second ring gear 2R is transmitted to the ring gear 3R of the third planetary gear unit 3. In this 5th-speed position, the first planetary gear unit 1 does not contribute to a speed changing action, since the first ring gear 1R is not connected to the input shaft 6. Thus, the main gear assembly 4 provides a speed reduction ratio which is represented by $1/(1+\rho_2)$. In the auxiliary gear unit 5, on the other hand, the engagement of the fifth clutch K5 permits the third planetary gear unit 3 as a whole to be rotated as a unit. Therefore, the rotary motion of the third ring gear 3R is directly transmitted to the output shaft 8 as in the 3rd-and 4th-speed positions. That is, the auxiliary gear assembly 5 is in the direct drive mode as described above, in which the assembly 5 does not contribute to a speed changing action of the gear device.

In the 5th-speed position as described above, the speed changing of the speed changing gear device is effected by the the second planetary gear unit 2 only, so that the speed of the output shaft 8 is increased with respect to that of the input shaft 6. Thus, the 5th-speed position is an overdrive position which has a speed reduction ratio lower than 1. The speed reduction ratio is represented by $1/(1+\rho_2)$, which is equal to 0.700. No circulation of power will occur in this 5th-speed position.

1ST-SPEED REVERSE POSITION

The 1st-speed reverse or rear drive position is established by engaging the second and third clutches K2, K3 and the second brake B2 of the main gear assembly 4, and the fifth clutch K5 of the auxiliary gear assembly 5. In this case, too, the speed changing of the gear device is effected by the main gear assembly 4 only, since the auxiliary gear assembly 5 is held in the direct drive mode by the engagement of the fifth clutch K5. More specifically, the rotation of the input shaft 6 is transmitted to the second sun gear 2S, through the second and third clutches K2, K3 which are currently engaged. The concurrent rotation of the input shaft 6 and the second sun gear 2S is transmitted to the second ring gear 2R while the second carrier 2C is held stationary by the second brake B2, whereby the second ring gear 2R is rotated in the reverse direction at a speed lower than that of the input shaft 6. Consequently, the reverse rotation of the second ring gear 2R is transmitted to the ring gear 3R of the third planetary gear unit 3 of the auxiliary gear assembly 5. Since the auxiliary gear assembly 5 does not contribute to a speed changing action as in the 3rd-, 4th- and 5th-speed forward drive positions, the speed changing of the gear device is actually effected by the second planetary gear unit 2 only, so that the output shaft 8 is rotated in the reverse direction at a speed lower than that of the input shaft 6. In this 1st-speed reverse position, the speed reduction ratio of the speed changing gear device is represented by $-1/\rho_2$, which is equal to $-2.336$ as indicated in the table of FIG. 1B. In this case, too, no circulation of power will occur.

2ND-SPEED REVERSE POSITION

The 2nd-speed reverse position is established by engaging the second and third clutches K2, K3 and the second brake B2 of the main gear assembly 4, and the third brake B3 of the auxiliary gear assembly 5. Consequently, the main gear assembly 4 functions to reduce the speed of the input shaft 6 and reverse the direction of rotation thereof, in the same manner as in the 1st-speed reverse position. In this case, however, the auxiliary gear assembly 5 also functions to further reduce the speed of the input shaft 6. More specifically, the speed reduction ratio provided by the main gear assembly 4 is represented by $-1/\rho_2$, as indicated just above, while the speed reduction ratio provided by the auxiliary gear assembly 5 is represented by $(1+\rho_3)$, as indicated with respect to the 1st-, 2nd-speed forward drive positions. In this 2nd-speed reverse position, the speed changing of the gear device is effected by both the main gear assembly 4 and the auxiliary gear assembly 5, so that the output shaft 8 is rotated in the reverse direction at a considerably lower speed with respect to the input shaft 6. The speed reduction ratio provided by the speed changing gear device is represented by $-(1+\rho_3)\rho_2$, which is equal to $-3.388$ as indicated in the table of FIG. 1B. In this case, too, no circulation of power will occur.

It will be understood from the above explanation concerning each operating position of the gear device that the shiftings between the 2nd- and 3rd-speed forward drive positions and between the 1st- and 2nd-speed reverse positions are effected by changing the operating state of the auxiliary gear assembly 5 while the main gear assembly 4 remains in the same state, and that the other shiftings are effected by changing the operating state of the main gear assembly 4 while the auxiliary gear assembly 5 remains in the same state. In the former case, the shiftings are accomplished by releasing the currently engaged one of the third brake B3 and the fifth clutch K5 of the auxiliary gear assembly 5, and engaging the other of the two members B3, K5. In the latter case, the shiftings are accomplished by releasing and engaging the appropriate ones of the members selected from the clutches K1-K4 and the brakes B1-B2 of the main gear assembly 4. That is, any shifting operation of the present speed changing gear device does not require simultaneous control of the main gear assembly 4 and the auxiliary gear assembly 5. As is apparent from the table of FIG. 1B, the speed changing gear device has the five forward drive positions and the two reverse or rear drive positions, each of the seven positions being established by operating only two frictional coupling elements selected from the five clutches K1-K5 and the three brakes B1-B3. Accordingly, the present gear device is relatively easy to control, and is free from shifting shock. The speed changing gear device shown in FIG. 1A is constituted by three single-pinion type planetary gear units which are disposed in series coaxially with each other. Thus, the present gear device is simple in construction and may be manufactured at a relatively reduced cost. Further, the gear ratios ρ of the first, second and third planetary gear units 1, 2, 3 may be suitably determined to be around 0.34–0.45 without increasing the radial size of the gear train of the gear device. Moreover, the present speed changing gear device permits the main gear assembly 4 alone to establish four forward drive positions and one reverse position. Therefore, a speed changing gear device having a reduced number of operating positions can be provided by eliminating the auxiliary gear assembly 5. Furthermore, no circulation of power will occur in any operating positions, assuring improved power transmitting efficiency. Additionally, the speed reduction rotios of the forward drive positions may be determined to vary in the form of a geometrical progression, without causing a considerable change in the driving force of the vehicle before and after the shiftings between these forward drive positions. Thus, the present speed changing gear drive exhibits improved power transmitting and speed changing characteristics. In the present gear device, the speeds of the three elements of each planetary gear unit 1, 2, 3, and the speeds of the planetary pinions 1P, 2P, 3P relative to those of the carriers 1C, 2C, 3C are relatively low, assuring improved durability of the gears, bearings or other members of the gear device. Since the amount of load torque applied to each of the frictional coupling elements such as clutches and brakes does not exceed the amount of torque of the input shaft while the gear device is placed in the frequently used forward drive positions, these coupling elements may be made small-sized, contributing to reduction in the overall size of the speed changing gear device.

It will be understood from the above explanation that the main gear assembly 4 and the auxiliary gear assembly 5 are independently operated so as to contribute to the speed changing of the speed changing gear device. Therefore, the auxiliary gear assembly 5 is not necessarily located adjacent the output shaft 8, but may be located between the input shaft 6 and the main gear assembly 4, as illustrated in FIG. 2. In this embodiment, the ring gear 3R of the third planetary gear unit 3 is held fixed to the input shaft 6, while the third carrier 3C is selectively connected to the first ring gear 1R through the first clutch K1, and to the first sun gear 1S through the second clutch K2.

In this arrangement, too, the speed changing gear device can provide five forward drive positions and two reverse positions as in the first embodiment, by operating the clutches K1–K5 and the brakes B1–B3 as indicated in the table of FIG. 1B.

Figure 3A:
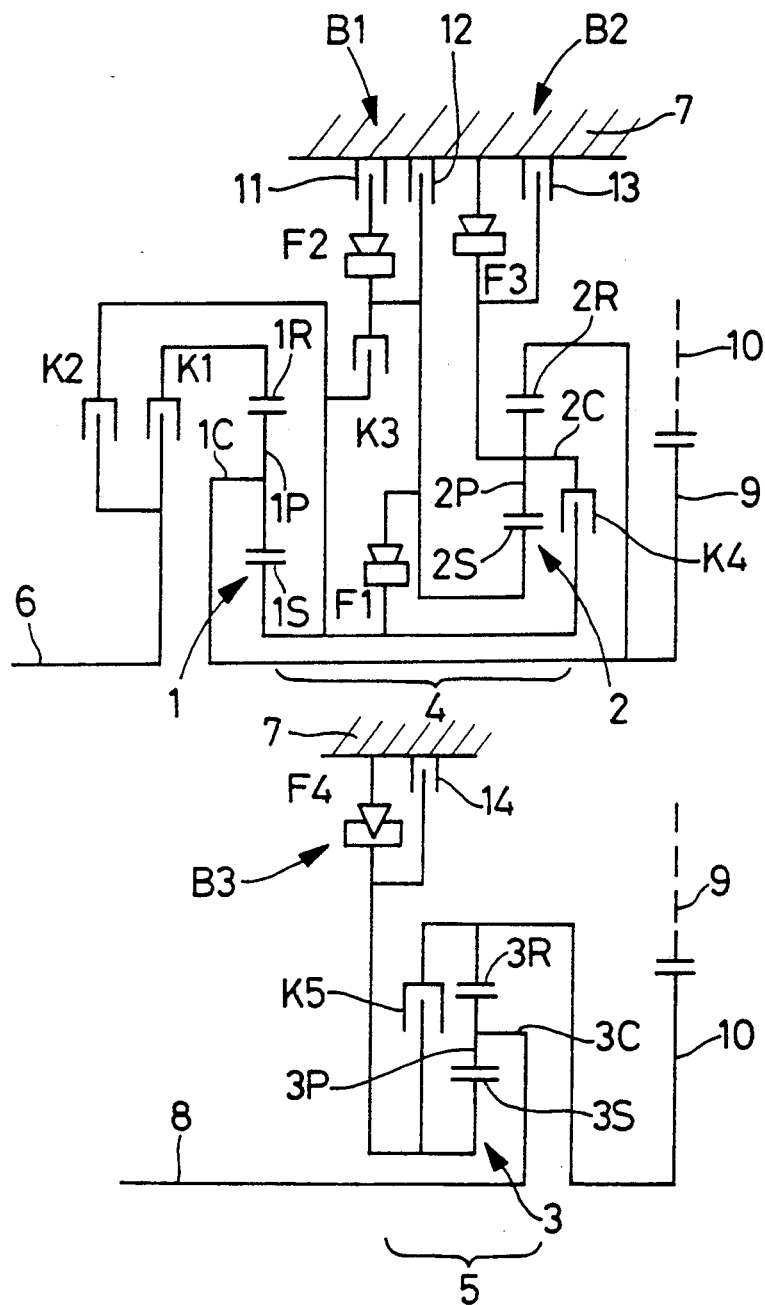

The speed changing gear device of the present invention may be modified such that the auxiliary gear assembly 5 is disposed on another axis parallel to the axis on which the main gear assembly 4 is disposed, as illustrated in FIG. 3A. This arrangement is effective to minimize the amount of shifting shock of the gear device. To assure noise-free running of the vehicle while inhibiting an engine brake, when needed, this embodiment uses one-way clutches in combination with multiple-disk clutches and brakes.

In this modified embodiment wherein the main gear assembly 4 and the auxiliary gear assembly 5 are disposed on different parallel axes, the first carrier 1C and the second ring gear 2R are fixed to a counter drive gear 9 which is located adjacent the second planetary gear unit 2, and the third ring gear 3R is fixed to a counter driven gear 10 which is located adjacent the third planetary gear unit 3 and which engages the counter drive gear 9. Between the second sun gear 2S and the first sun gear 1S, there is provided a first one-way clutch F1 which is engaged to permit power (torque) transmission only when the second sun gear 2S and the first sun gear 1S are rotated relative to each other in the forward direction. In the main gear assembly 4, the first brake B1 is constituted by a combination of a second one-way clutch F2 and a first multi-disk brake 11 which are disposed in series, and a second multi-disk brake 12 which is disposed parallel to the combination of the two members F2, 11. The second one-way clutch F2 is engaged to permit torque transmission only when the second sun gear 2S is rotated in the reverse direction (in the direction opposite to the rotating direction of the input shaft 6). On the other hand, the second brake B2 is constituted by a third one-way clutch F3 and a third multiple-disk brake 13 which are disposed parallel to each other. The third one-way clutch F3 is engaged to transmit torque transmission when the carrier 2C of the second planetary gear unit 2 is rotated in the reverse direction. In the auxiliary gear assembly 5, the third brake B3 is constituted by a fourth one-way clutch F4 and a fourth multi-disk brake 14 which are disposed parallel to each other. The fourth one-way clutch F4 is engaged to permit torque transmission when the sun gear 3S of the third planetary gear unit 3 is rotated in the reverse direction.

The speed changing gear device shown in FIG. 3A is adapted to provide five forward drive positions and two reverse positions, as indicated in FIG. 3B, which also indicates the operating states of the clutches and brakes, by way of example. The speed reduction ratios of the operating positions provided in this embodiment are substantially equal to those as indicated in the table of FIG. 1B.

Figure 4A:
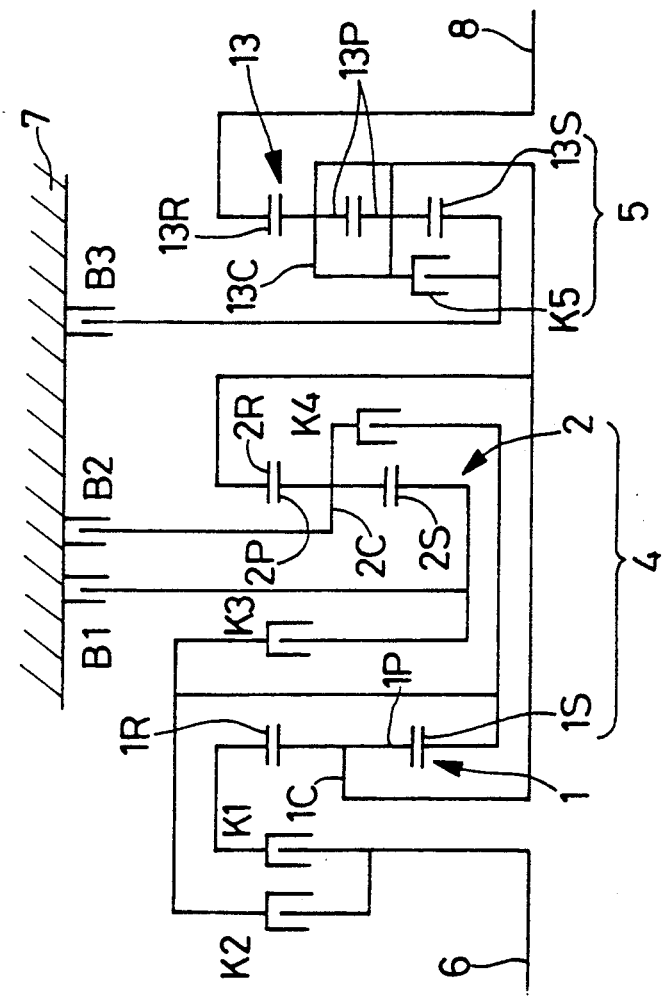

Referring next to FIG. 4A, there is illustrated another embodiment of the present invention, wherein the auxiliary gear assembly 5 is constituted by a double-pinion type planetary gear unit 13. More specifically, the planetary gear unit 13 includes as major elements a sun gear 13S, a pair of mutually meshing planetary pinions 13P one of which meshes with the sun gear 13S, a ring gear 13R coaxial with the sun gear 13S and meshing with the other of the planetary pinions 13P, and a carrier 13C disposed between the sun and ring gears 13S, 13R for rotatably supporting the planetary pinions 13P. The fifth clutch is provided between the carrier 13C and the sun gear 13S, and the third brake B3 is provided between the sun gear 13S and the casing 7, as in the preceding embodiments. However, the present embodiment is different from the preceding embodiments in that the first carrier 1C and the second ring gear 2R of the main gear assembly 4 are fixed to the carrier 13C, while the ring gear 13R is fixed to the output shaft 8. Like the first embodiment shown in FIG. 1, the instant speed changing gear device shown in FIG. 4A is capable of providing five forward drive positions and two reverse positions, by operating appropriate ones of the coupling elements selected from the clutches K1–K5 and the brakes B1–B3, as indicated in the table of FIG. 4B. The table also indicates the speed reduction ratio of each operating position of the speed changing gear device, where gear ratios $\rho_1$, $\rho_2$, $\rho_4$ of the three planetary gear units 1, 2, 13 are 0.339, 0.428 and 0.311, respectively. As is apparent from the tables of FIGS. 1B and 4B, the speed reduction ratios obtained by the gear device of FIG. 4A are substantially equal to those obtained by the gear device of FIG. 1A.

Figure 5:
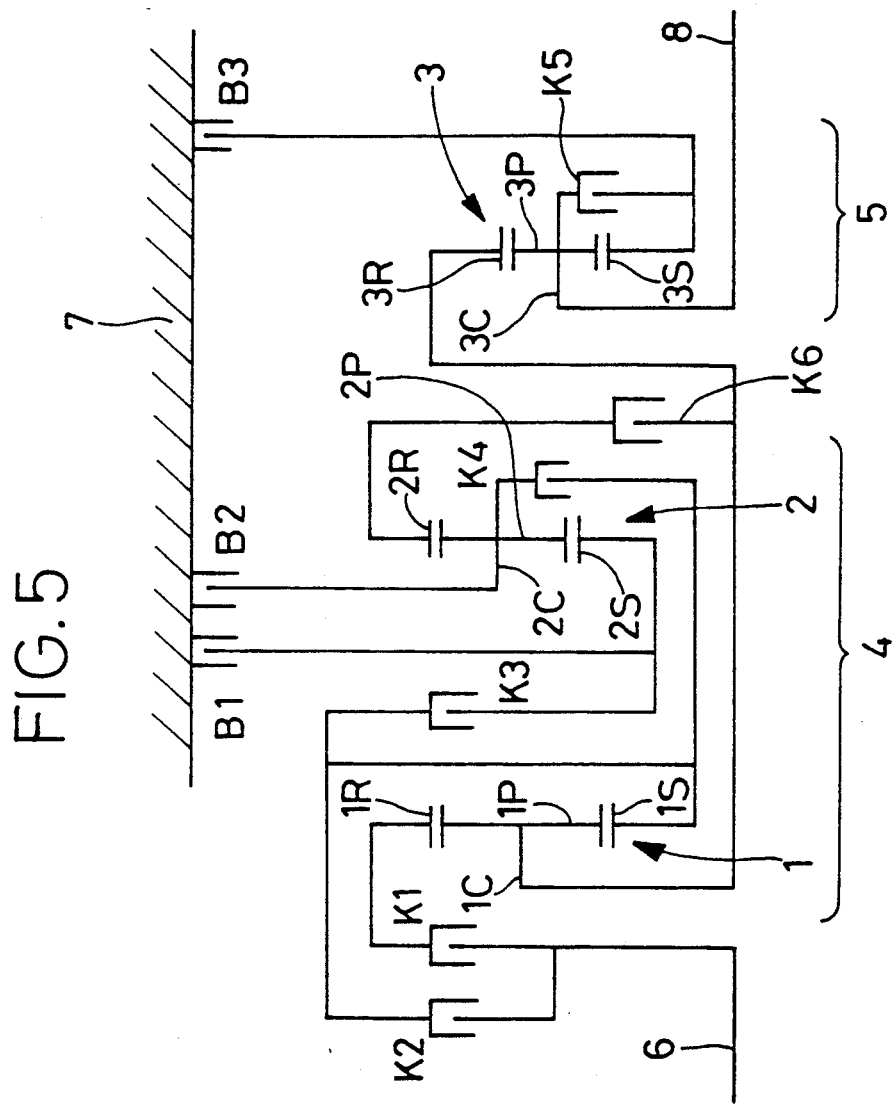

While the present invention has been described in its presently preferred embodiments, it is to be understood that the invention is not limited to the details of the illustrated embodiments, but may be otherwise embodied. It will be understood from the tables of FIGS. 1B and 3B that the first planetary gear unit 1 of the main gear assembly 3 does not contribute to a speed changing action while the gear device is placed in the 5th-speed forward drive position or either one of the two reverse positions, and that the second planetary gear unit 2 does not contribute to a speed changing action while the gear device is placed in the 2nd-speed or 3rd-speed position. While the carrier 1C of the first planetary gear unit 1 and the ring gear 2R of the second planetary gear unit 2 are fixed to each other in the illustrated embodiments, there may be provided suitable clutch means, such as a clutch K6 as shown in FIG. 5, between the first carrier 1C and the second ring gear 2R, so that these two members 1C, 2R can be disconnected from each other so as to prevent one of the members 1C, 2R from being unnecessarily rotated with the other member 1C, 2R when the gear device is in the 2nd-speed or 3rd-speed position, that is, when the first or second planetary gear unit 1, 2 having the above one member 1C, 2R does not contribute to the relevant speed changing action. The construction of the clutch means and brake means of the invention is not limited to those of the illustrated embodiments, but may be suitably modified. For example, the clutch or brake means as disclosed in Japanese Patent Applications Nos. 63-176270 and 63-221670 may be employed.

What is claimed is:

1. A speed changing gear device for an automatic transmission having an input member and an output member, comprising:
    a main gear assembly disposed between said input member and said output member for providing a plurality of operating position including at least four forward-drive positions and one reverse position, and including a single-pinion type first planetary gear unit having a first sun gear, a first planetary pinion meshing with the first sun gear, a first ring gear meshing with the first planetary pinion, and a first carrier rotatably supporting the first planetary pinion, and a single-pinion type second planetary gear unit having a second gear, a second planetary pinion meshing with the second sun gear, a second ring gear meshing with the second planetary pinion, and a second carrier rotatably supporting the second planetary pinion;
    an auxiliary gear assembly interposed between said input member of the transmission and said main gear assembly, for providing a direct drive position whose speed reduction ratio is 1, and a speed changing drive position whose speed reduction ratio is other than 1, said auxiliary gear assembly including a third planetary gear unit having a third sun gear, at least one third planetary pinion meshing with said third sun gear, a third ring gear meshing with said at least one third planetary pinion, and a gear meshing with said at least one third planetary pinion, and a third carrier rotatably supporting said at least one third planetary pinion;
    said main gear assembly further including
        (a) one of (i) fixing means for fixing said first carrier and said second ring gear to each other, and (ii) first clutch means for selectively connecting the first carrier and second ring gear to each other,
        (b) second clutch means for selectively connecting said first sun gear and said second sun gear to each other,
        (c) third clutch means for selectively connecting said first sun gear and said second carrier to each other,
        (d) first brake means for selectively inhibiting said second sun gear from rotating, and
        (a) second brake means for selectively inhibiting said second carrier from rotating, and
    said auxiliary gear assembly being interposed between said input member, and said first ring gear and said second and third clutch means, said third ring gear being fixed to said input member.

2. A speed changing gear device according to claim 1, wherein said first ring gear is connected to said third carrier, and said first sun gear is connected to the third carrier.

3. A speed changing gear device for an automatic transmission having an input member and an output member, said speed changing device comprising:
    a main gear assembly between said input member and said output member, for providing a plurality of operating positions, including at least four forward-drive positions and one reverse position, said gear assembly including a single-pinion type first planetary gear unit having a first sun gear, a first planetary pinion meshing with the first sun gear, a first ring gear meshing with the first planetary pinion, and a first carrier rotatably supporting the first planetary pinion, and a single-pinion type second planetary gear unit having a second sun gear, a second planetary pinion meshing with the second sun gear, a second ring gear meshing with the second planetary pinion, and a second carrier rotatably supporting the second planetary pinion; and
    an auxiliary gear assembly between said input member and said output member, for providing a direct drive position having a speed reduction ratio of 1, and a speed changing drive position having a speed reduction ratio of other than 1, said auxiliary gear assembly including a third planetary gear unit having a third sun gear, at least one third planetary pinion meshing with said third sun gear, a third ring gear meshing with said at least one third planetary pinion, and a third carrier rotatably supporting said at least one third planetary pinion;
    said main gear assembly further including:
        (a) one of (i) fixing means for fixing said first carrier and said second ring gear to each other, and (ii) first clutch means for connecting said first carrier and second ring gear;
        (b) second clutch means for connecting said first sun gear and said second sun gear;
        (c) third clutch means for connecting said first sun gear and said second carrier;
        (d) first brake means for inhibiting said second sun gear; and
        (e) second brake means for inhibiting said second carrier from rotating;
    said first planetary unit being positioned on a side of the main gear assembly closest to the input member, and said second planetary gear unit being positioned on a side of the main gear assembly closest to the output member, and said first and second planetary gear units being placed in an axial direction of said main gear assembly;

said auxiliary gear assembly being interposed between said input member and said first ring gear and said second and third clutch means, said third ring gear being fixed to the input member.

* * * * *